United States Patent
Zhang et al.

(10) Patent No.: US 12,090,458 B2
(45) Date of Patent: Sep. 17, 2024

(54) MICRO-INTERFACE ENHANCED OXIDATION SYSTEM AND OXIDATION METHOD FOR PREPARING HYDROGEN PEROXIDE

(71) Applicant: NANJING INSTITUTE OF MICROINTERFACE TECHNOLOGY CO., LTD, Nanjing (CN)

(72) Inventors: Zhibing Zhang, Nanjing (CN); Zheng Zhou, Nanjing (CN); Hongzhou Tian, Nanjing (CN); Lei Li, Nanjing (CN); Feng Zhang, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Yu Cao, Nanjing (CN)

(73) Assignee: NANJING INSTITUTE OF MICROINTERFACE TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/575,304

(22) PCT Filed: Jul. 30, 2021

(86) PCT No.: PCT/CN2021/109758
§ 371 (c)(1),
(2) Date: Dec. 29, 2023

(87) PCT Pub. No.: WO2023/284028
PCT Pub. Date: Jan. 19, 2023

(65) Prior Publication Data
US 2024/0261748 A1 Aug. 8, 2024

(30) Foreign Application Priority Data

Jul. 16, 2021 (CN) .......................... 202110804027.6

(51) Int. Cl.
*B01J 10/00* (2006.01)
*B01J 8/00* (2006.01)
(Continued)

(52) U.S. Cl.
CPC ............. *B01J 10/002* (2013.01); *B01J 8/008* (2013.01); *B01J 19/006* (2013.01); *B01J 20/28054* (2013.01); *C01B 15/023* (2013.01)

(58) Field of Classification Search
CPC ........ B01J 8/008; B01J 19/006; B01J 10/002; B01J 2219/00765; B01J 2219/00777; B01J 2208/02
See application file for complete search history.

(56) References Cited

FOREIGN PATENT DOCUMENTS

| CN | 112044364 A | 12/2020 |
|---|---|---|
| CN | 112499592 A | 3/2021 |

*Primary Examiner* — Lessanework Seifu
(74) *Attorney, Agent, or Firm* — Chun-Ming Shih; LANWAY IPR SERVICES

(57) ABSTRACT

The invention provides a micro-interface enhanced oxidation system and an oxidation method for preparing hydrogen peroxide, wherein the micro-interface enhanced oxidation system includes: an oxidation reactor, wherein a top portion of a side surface is provided with a liquid phase pipeline for delivering hydrogenated anthraquinone, and a bottom portion of the side surface is provided with a gas phase pipeline for delivering air; and a liquid distributor, a packing section, a seal pan and a hybrid micro-interface unit that are arranged in order from top to bottom are arranged in the oxidation reactor, wherein the hybrid micro-interface unit comprises a upper-mounted micro-interface generator and a lower-mounted micro-interface generator that are communicated with each other up and down, and the hydrogenated anthra- (Continued)

quinone delivered in goes down in turn until being mixed with the air in the hybrid micro-interfacial unit to be dispersed and crushed after being distributed through the liquid distributor.

3 Claims, 1 Drawing Sheet

(51) Int. Cl.
    *B01J 19/00*     (2006.01)
    *B01J 20/28*     (2006.01)
    *C01B 15/023*     (2006.01)

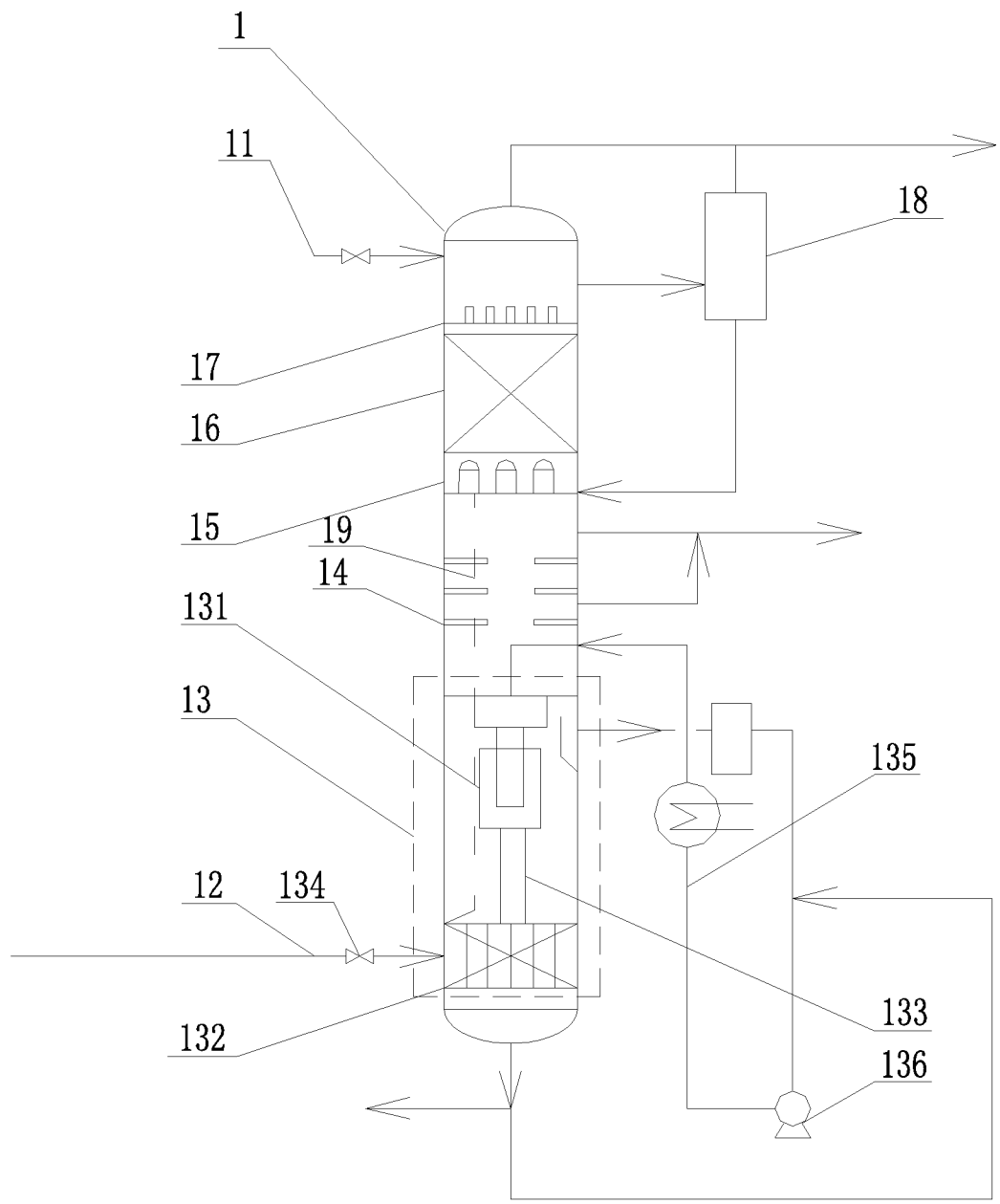

MICRO-INTERFACE ENHANCED OXIDATION SYSTEM AND OXIDATION METHOD FOR PREPARING HYDROGEN PEROXIDE

FIELD OF THE INVENTION

The present invention relates to the technical field of hydrogen peroxide preparation, in particular to a micro-interface enhanced oxidation system and an oxidation method for preparing hydrogen peroxide.

BACKGROUND OF THE INVENTION

Hydrogen peroxide is an aqueous solution of hydrogen peroxide ($H_2O_2$), which is an important inorganic peroxide, with the characteristics of oxidation, bleaching and environmental protection during use. It can be used in fabrics, pulp decolorization, chemical synthesis, wastewater treatment, medical treatment, metallurgy, military industry, food processing and other fields, as an oxidizing agent, bleaching agent, disinfectant, polymer initiator and crosslinking agent, propellant, etc. With the increasingly stringent environmental protection regulations, the production capacity of propylene oxide, green caprolactam and other products by hydrogen peroxide direct oxidation method (HPPO method) has increased, resulting in strong market demand for $H_2O_2$.

The production methods of hydrogen peroxide include anthraquinone method, electrolysis method, isopropanol oxidation method, inorganic reaction method, direct synthesis method of hydrogen and oxygen, etc. The anthraquinone method is currently the mainstream method for producing hydrogen peroxide at home and abroad.

The production process of hydrogen peroxide using the anthraquinone method is performed by formulating into a solution with a certain composition (working solution) with 2-ethylanthraquinone (EAQ) as the carrier, heavy aromatics (AR) and tri-octyl phosphate (TOP) as the mixed solvent, then performing catalytic hydrogenation and air oxidation of alkyl anthraquinones alternatively under the catalysis of catalysts of palladium or nickel, and extracting the hydrogen peroxide produced by oxidation with water to produce a crude hydrogen peroxide, wherein the alkyl anthraquinones can be recycled. However, in the current process, the utilization rate of oxygen in the oxidation process is relatively low, resulting in a relatively low yield of the prepared hydrogen peroxide.

In view of this, the present invention is proposed.

SUMMARY OF THE INVENTION

A first objective of the invention is to provide a micro-interface enhanced oxidation system for preparing hydrogen peroxide. For the micro-interface enhanced oxidation system, a hybrid micro-interface unit is arranged inside an oxidation reactor, so that the air is broken into micro-bubbles before the oxidation reaction between the air and hydrogenated anthraquinone, which improves the phase boundary mass transfer area between the air and the hydrogenated anthraquinone, thereby solving the problem of low product yield due to low utilization of the oxygen since the air and the hydrogenated anthraquinone may not be fully mixed inside the oxidation reactor in the prior art.

A second objective of the invention is to provide a reaction method using the micro-interface enhanced oxidation system for preparing hydrogen peroxide. The hydrogen peroxide obtained by the reaction has a high purity, and the method is widely used, which improves the applicability of the hydrogen peroxide itself, and is worthy of wide popularization and application.

In order to realize the above-mentioned objectives of the present invention the following technical schemes is specially adopted.

The invention provides a micro-interface enhanced oxidation system for preparing hydrogen peroxide, including: an oxidation reactor, wherein a top portion of a side surface of the oxidation reactor is provided with a liquid phase pipeline for delivering hydrogenated anthraquinone, and a bottom portion of the side surface of the oxidation reactor is provided with a gas phase pipeline for delivering air; and a liquid distributor, a packing section, a seal pan and a hybrid micro-interface unit that are arranged in order from top to bottom are arranged in the oxidation reactor, wherein the hybrid micro-interface unit comprises a upper-mounted micro-interface generator and a lower-mounted micro-interface generator that are communicated with each other up and down, and the hydrogenated anthraquinone delivered in goes down in turn until being mixed with the air in the hybrid micro-interfacial unit to be dispersed and crushed after being distributed through the liquid distributor.

The liquid distributor can play a good role in liquid distribution.

Preferably, a long and narrow gas-liquid emulsion channel is arranged between the upper-mounted micro-interface generator and the lower-mounted micro-interface generator, and the gas-liquid emulsion channel is connected with a gas-liquid emulsion outlet, and the gas-liquid emulsion channel is connected to the outlet of the gas-liquid emulsion. The liquid emulsion outlet is close to the upper side wall of the lower-mounted micro-interface generator.

In the micro-interface enhanced oxidation system of the invention, the raw material is the hydrogenated anthraquinone and the air, wherein the hydrogenated anthraquinone is a product obtained by hydrogenation in a hydrogenation tower. Generally, during actual operation, firstly, a working solution and a catalyst containing anthraquinone derivatives are sent to the hydrogenation tower while delivering hydrogen to the hydrogenation tower so as to generate a mixture containing 2-ethylhydroanthraquinone solution; then, after being filtered and cooled, the mixture is sent to an oxidation reactor, where the mixture forms a gas-liquid emulsion with the air dispersed and crushed by the micro interface in the oxidation reactor to perform the oxidation reaction so as to generate a mixture containing 2-ethylanthraquinone and hydrogen peroxide, which is delivered to an extraction tower; finally, the mixture containing 2-ethylanthraquinone and hydrogen peroxide is extracted with pure water in the extraction tower, and a product obtained after the extraction is the hydrogen peroxide.

In the solution of the invention, by arranging the hybrid micro-interface unit in the oxidation reactor, the utilization rate of the air may be improved, and then the yield of the product hydrogen peroxide may be increased. The hybrid micro-interface unit is a combination of micro-interface generators through a specific structure, which includes an upper-mounted micro-interface generator and a lower-mounted micro-interface generator that need to be combined up and down to communicate with each other and are not arranged separately so as to improve the firmness of the entire micro-interface unit. Since the space in the oxidation reactor itself is relatively narrow, the normal operation of the oxidation reactor will be affected if the micro-interface generators are arranged too diffusely, and in addition, the structure that is designed integrally also shortens a distance between each of the micro-interface generators, which strengthens the interoperability between various components, thereby improving the dispersion and crushing effect after the bubbles crushed through the micro interface collide with each other. The collision, dispersion and crushing of the gas-liquid emulsion is strengthened through inter-communicated channels.

Further, in the solution of the invention, the upper-mounted micro-interface generator and the lower-mounted micro-interface generator are communicated with each other up and down through a gas-liquid emulsion channel, and the gas-liquid emulsion channel is directly communicated with a gas-liquid emulsion outlet; the gas-liquid emulsion outlet is an outlet of the gas-liquid emulsion formed after the dispersion and crushing in the upper-mounted micro-interface generator. Since in the oxidation reactor, an upper portion belongs to a mixing area and a lower portion belongs to a violent reaction area, the materials in the upper portion are mixed relatively stable, while the reaction in the lower portion is more violent. In order to improve the reaction effect, the gas-liquid emulsion channel may be slightly longer, so that the power is provided for the materials that are exported from the gas-liquid emulsion outlet through the guiding effect of the gas-liquid emulsion channel, and the gas-liquid emulsion coming out of the outlet immediately reacts with the micro-interface generator placed below since the gas-liquid emulsion outlet is just close to an upper side wall of the lower-mounted micro-interface generator so as to improve the dispersing and crushing effects. Although the gas-liquid emulsion channel is not clearly shown in the FIGURE, the specific structure is relatively clear through the text description of the invention.

Moreover, the gas-liquid emulsion outlet may be arranged as a straight pipe along a horizontal direction, or as a bent pipe with a degree of 90° with a nozzle being vertically upward or vertically downward, wherein when in the horizontal direction, the materials may be ejected directly from the nozzle, and the direction arranged vertically upward or downward is equivalent to a 180 return bend at the outlet, thereby further improving the circulation energy of the gas-liquid emulsion to drive the materials with poor mixing effect in the upper portion to be back-mixed and then crushed. The best way is to design the nozzle to go out in multiple directions; in particular, after the dispersed and crushed bubbles from the micro-interface generator in the lower portion come out from micropores on a wall surface, they collide with the gas-liquid emulsion coming out of the gas-liquid emulsion outlet immediately, and the gas-liquid emulsion outlet may completely cover the micropores on the wall surface of the lower-mounted micro-interface generator.

Preferably, in the hybrid micro-interface unit, the upper-mounted micro-interface generator is a gas-liquid linkage micro-interface generator or a hydraulic micro-interface generator, and the lower-mounted micro-interface generator is a pneumatic micro-interface generator. A crushed gas phase of the pneumatic micro-interface generator disperses from holes on the wall surface and interacts with the gas-liquid emulsion from the upper-mounted micro-interface generator to enhance the effect of dispersion, fusion and collision. The gas-liquid emulsion outlet of the hybrid micro-interface unit in the upper portion may be designed to be along the horizontal direction, and the gas-liquid emulsion outlet of the hybrid micro-interface unit in the lower portion may be designed to be vertically upward because the lower portion belongs to the reaction area, so that the ejected gas-liquid emulsion is directed upwards to further improve the mixing effect with the materials in the upper portion in order to improve the reaction effect, thereby improving the reaction effect, and then improving the utilization rate of raw materials. After the operation using the oxidation reaction tower with the specific structure of the invention, the conversion rate of the hydrogenated anthraquinone may reach more than 97%, the product yield may reach more than 97%, and the utilization rate of the oxygen may reach more than 99%, basically without any waste.

Preferably, the upper-mounted micro-interface generator is located closer to a top portion of the oxidation reactor, the lower-mounted micro-interface generator is located relatively closer to a bottom portion of the oxidation reactor, and the gas-liquid emulsion channel runs through between the upper micro-interface generator and the lower micro-interface generator. This can ensure that the gas-liquid emulsion is long enough to give enough momentum to move towards the down-mounted micro-interface generator.

Preferably, the micro-interface enhanced oxidation system of the invention further includes a liquid circulation pipeline, wherein the gas-liquid linkage micro-interface generator or the hydraulic micro-interface generator is connected with a liquid phase circulation pipeline, and a circulation pump is arranged on the liquid phase circulation pipeline. In this way, the liquid phase coming out from a side surface of the oxidation reactor and from the bottom portion of the oxidation reactor returns to a top portion of the upper-mounted micro-interface generator through the liquid circulation pipeline, and the circulation pipeline provides power for the liquid phase to continuously entrain a gas phase for achieving the effect of dispersion and crushing so that the oxygen located at the top portion of the oxidation reactor is entrained through an entrainment pipe for further utilization.

Preferably, the upper-mounted micro-interface generator and the lower-mounted micro-interface generator are respectively provided with a separate control valve for switching working states when the micro-interface generator is blocked. When the lower-mounted micro-interface generator is the pneumatic micro-interface generator, the micropores on the wall surface are easily blocked; therefore, the generator may be directly switched out of the system to stop working. The above problem may also be solved by using only the upper-mounted micro-interface generator to operate, or by using the momentum of an upper-mounted gas-liquid emulsion channel to flush the pneumatic micro-interface generator.

Those skilled in the art can understand that the micro-interface generator used in the present invention has been embodied in the inventor's previous patents, such as patents with application numbers CN201610641119.6, CN201610641251.7, CN201710766435.0, CN106187660, CN105903425A, CN109437390A, CN205833127U and CN207581700U. In the previous patent CN201610641119.6, the specific product structure and working principle of the micro-bubble generator (that is, the micro-interface generator) were introduced in detail. The applicant document records that "the micro-bubble generator include a main body and a secondary crushing part, the main body has a cavity, the main body is provided with an inlet communicating with the cavity, and the opposite first end and second end of the cavity are open, wherein the cross-sectional area of the cavity decreases from the middle of the cavity to the first end and the second end of the cavity. The secondary crushing part is arranged at least one of the first end and the second end of the cavity, a part of the secondary crushing part is set in the cavity, and an annular channel is formed between the secondary crushing part and through holes opened at both the first end and the second end of the cavity. The micro-bubble generator also includes an air inlet pipe and a liquid inlet pipe. "From the specific structure disclosed in the application document, it can be known that its specific working principle is the liquid enters the micro-bubble generator tangentially through the liquid inlet pipe, rotates a ultra-high speed and cuts the gas, so that the gas bubbles are broken into micron-level micro-bubbles. Thereby increasing the mass transfer area between the liquid phase and the gas phase, and the micro-bubble generator in this patent belongs to the pneumatic micro-interface generator.

In addition, it is recorded in the prior patent CN 201610641251.7 that the primary bubble breaker has a circulating liquid inlet, a circulating gas inlet, and a gas-liquid mixture outlet, while the secondary bubble breaker connects the feed port with the gas-liquid mixture outlet, which indicates that the bubble breaker needs to mix gas and liquid to enter. In addition, it can be seen from the following drawings that the primary bubble breaker mainly uses circulating fluid as power. In fact, the primary bubble breaker belongs to the hydraulic micro-interface generator, and the secondary bubble breaker simultaneously passes the gas-liquid mixture into the elliptical rotating ball for rotation, so as to achieve bubble breaking during the rotation process. Therefore, the secondary bubble breaker is actually a gas-liquid linkage micro-interface generator. In fact, whether it is a hydraulic micro-interface generator or a gas-liquid linkage micro-interface generator, they all belong to a specific form of the micro-interface generator, but the micro-interface generator used in the present invention is not limited to the above-mentioned several forms. The specific structure of the bubble breaker described in the prior patents is only one of the forms that the micro-interface generator of the present invention can adopt. In addition, it is recorded in the previous patent CN201710766435.0 that "the principle of the bubble breaker is high-speed jet flow to achieve gas collision", and it also explains that it can be used in the micro-interface enhanced reactor to verify the correlation between the bubble breaker and the micro-interface generator. Moreover, there are relevant records for the specific structure of the bubble breaker in the prior patent CN106187660, specifically see paragraphs [0031]-[0041] in the description, and the accompanying drawings, which have specific working principles for the bubble breaker S-2. The top of the bubble breaker is the liquid phase inlet, and the side is the gas phase inlet. The entrainment power is provided by the liquid phase coming in from the top, so as to achieve the effect of crushing into ultra-fine bubbles. It can also be seen in the attached drawings that the bubble breaker has a conical structure. The diameter of the upper part is larger than that of the lower part, which is also for the liquid phase. It can provide better suction power.

Since the micro-interface generator was just developed in the early stage of the patent application, it was maned micro-bubble generator (CN201610641119.6) and bubble breaker (201710766435.0) in the early stage. With continuous technological improvement, it was later renamed as micro-interface generator. Now the micro-interface generator in the present invention is equivalent to the previous micro-bubble generator, bubble breaker, etc., but the name is different.

In summary, the micro-interface generator of the present invention belongs to the prior art, although some bubble breakers belong to the type of pneumatic bubble breaker, some bubble breakers belong to the type of hydraulic bubble breaker, and some belong to the type of pneumatic bubble breaker. The type of liquid linkage bubble breaker, but the difference between the types is mainly selected according to the specific working conditions. In addition, the connection between the micro-interface generator, the reactor, and other equipment, including the connection structure and connection position, depends on the structure of the micro-interface generator, which is not limited.

Preferably, both sides of the inner wall of the oxidation reactor are provided with grilles for improving the reaction effect. Because the material itself has a lot of foam, a number of grilles are correspondingly set in the middle of the oxidation reactor.

Preferably, the micro-interface enhanced oxidation system of the present invention also includes a gas-liquid separator, and after the gas phase at the upper part of the liquid distributor in the oxidation reactor passes through the gas-liquid separation of the gas-liquid separator. The gas phase is discharged, and the liquid phase is returned to the lower part of the liquid receiving plate. Then the liquid phase participates in the reaction, and the gas phase part goes through the bubble cap to the top of the reactor.

Preferably, a downcomer is provided on the side of the bubble-cap tray, and the inside of the downcomer is a circular downcomer, and the downcomer is close to the inner wall of the downcomer or connected to the inner wall of the downcomer through a pipe.

Preferably, a downcomer is provided outside the oxidation reactor, the upper end of the downcomer communicates with the bubble-cap tray, and the lower end communicates with the mixing micro-interface unit. The downcomer can be installed inside the oxidation reactor or outside the oxidation reactor. The specific structure of the downcomer installed inside is a circular downcomer. Of course, the location of the downcomer can be directly attached to the wall. The setting can also be kept at a certain distance from the wall.

In addition, the upper part of the mixing micro-interface generator is also equipped with multi-layer trays, the purpose is to change the state of fully mixed flow into plug flow, so as to better eliminate the foam generated by the reaction.

The present invention also provides an oxidation method of a micro-interface enhanced oxidation system for preparing hydrogen peroxide, including the following steps:
  oxidizing the air with the hydrogenated anthraquinone to generate the hydrogen peroxide after being subjected to micro-interface crushing.

Preferably, the oxidation reaction temperature is 35-60° C., preferably 45-55° C., and the reaction pressure is 0.2-0.4 MPa, preferably 0.25-0.35 MPa.

The hydrogen peroxide product obtained by the oxidation method of the invention has good quality and high yield. The preparation method itself has low reaction temperature, greatly reduced pressure, and high liquid hourly space velocity, which is equivalent to increased production capacity.

Compared with the prior art, the invention has the following beneficial effects:
  (1) In the invention, a hybrid micro-interface unit is arranged inside an oxidation reactor, so that the air is broken into micro-bubbles before the oxidation reaction between the air and hydrogenated anthraquinone, which improves the phase boundary mass transfer area between the air and the hydrogenated anthraquinone, thereby solving the problem of low product yield due to low utilization of the oxygen since the air and the hydrogenated anthraquinone may not be fully mixed inside the oxidation reactor in the prior art;

(2) In the invention, the oxidation method is simple in operation, the hydrogen peroxide obtained by the reaction has a high purity, and the method is widely used, which improves the applicability of the hydrogen peroxide itself, and is worthy of wide popularization and application.

BRIEF DESCRIPTION OF THE DRAWINGS

Various other advantages and benefits will become apparent to those of ordinary skill in the art upon reading the following detailed description of the preferred embodiments. The drawings are merely for the purpose of illustrating preferred embodiments and are not to be considered as limiting the invention. In the attached drawings:

FIG. 1 is a structure diagram of a micro-interface enhanced oxidation system for preparing hydrogen peroxide provided by an embodiment of the invention.

DESCRIPTION OF THE PREFERRED EMBODIMENTS

Exemplary embodiments will be described in detail herein, and examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present invention. Rather, they are merely examples of apparatuses and methods consistent with aspects of the present invention are recited in the appended claims.

The terminologies used in the present invention are for the purpose of describing embodiments only and are not intended to limit the present invention. As used in the invention and the appended claims, the singular forms "a" and "said" and "the" are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the present invention to describe various information, the information should not be limited to these terms. These terms are only used to distinguish information of the same type from one another. For example, without departing from the scope of the present invention, first information may also be called second information, and similarly, second information may also be called first information. Depending on the context, the word "if" as used herein may be interpreted as "at" or "when" or "in response to a determination".

In order to illustrate the technical schemes in the present invention more clearly, the following will be described in the form of specific embodiments.

Embodiment

With reference to FIG. 1, a micro-interface enhanced oxidation system for preparing hydrogen peroxide according to an embodiment of the invention, which mainly includes an oxidation reaction tower 1 and a hybrid micro-interface unit 13 arranged inside the oxidation reaction tower 1, wherein in the oxidation reaction tower 1, hydrogenated anthraquinone and air are mainly oxidized to produce the hydrogen peroxide; in order to improve the oxidation effect, a grille 14 for improving the reaction effect are arranged on both sides of an inner wall of the oxidation reaction tower, and the grids 14 are arranged symmetrically on the left and right.

The hybrid micro-interface unit 13 of the embodiment includes an upper-mounted micro-interface generator 131 and a lower-mounted micro-interface generator 132 that are communicated with each other up and down; a gas-liquid emulsion channel 133 is arranged between the upper-mounted micro-interface generator 131 and the lower-mounted micro-interface generator 132, the gas-liquid emulsion channel 133 is connected with a gas-liquid emulsion outlet, and the gas-liquid emulsion outlet is close to an upper side wall of the down-mounted micro-interface generator 132; a direction of the gas-liquid emulsion outlet is a straight pipe along a horizontal direction or a bent pipe with a degree of 90°, with a nozzle being vertically upward or vertically downward; in the embodiment, the direction is the horizontal direction. A top portion of the upper-mounted micro-interface generator 131 is provided with an entrainment pipe for entraining the air at a top portion of the tower.

In the hybrid micro-interface unit 13 of an embodiment of the invention, the upper-mounted micro-interface generator 131 is a gas-liquid linkage micro-interface generator or a hydraulic micro-interface generator, and the lower-mounted micro-interface generator 132 is a pneumatic micro-interface generator. The gas-liquid linkage micro-interface generator or the hydraulic micro-interface generator is connected with a liquid phase circulation pipeline 135, wherein the liquid phase circulation pipeline 135 is provided with a circulation pump 136, and the liquid phase circulation pipeline 135 is used to provide entrainment power for the upper-mounted micro-interface generator 131 so that, the liquid phase from a side surface of the oxidation reaction tower 1 and from a bottom portion of the oxidation reaction tower 1 returns to the top portion of the upper-mounted micro-interface generator 131 through the liquid circulation pipeline 135. In short, part of a liquid phase coming out from the bottom portion of the oxidation reaction tower 1 is emptied, while the other part merges with the liquid phase coming out of the side surface of the oxidation reaction tower 1 to pass through a gas-liquid separator for gas-liquid separation and return through the circulation pump 136.

Through the dispersion and crushing action of the micro-interface generator unit, the oxygen is crushed into micro-scale micro-bubbles, and the bubbles are released into the inside of the oxidation reaction tower 1, so that the air may be fully contacted with the hydrogenated anthraquinone in the state of micro-bubbles.

In addition, the upper-mounted micro-interface generator 131 and the lower-mounted micro interface generator 132 are respectively provided with a separate control valve 134 for switching working states when the micro-interface generator is blocked; the lower-mounted micro interface generator is generally selected as a pneumatic type, so it is more likely to be blocked, then the control valve 134 may be closed, and only the upper-mounted micro-interface generator 131 is used to operate alone, and the lower-mounted micro-interface generator 132 may be flushed when the upper-mounted micro-interface generator 131 is in operation. If the lower-mounted micro-interface generator is not used, the gas phase may directly go to the upper-mounted micro-interface generator for entrainment through branches of the gas phase pipeline.

A top portion of a side surface of the oxidation reaction tower 1 is provided with a liquid phase pipeline 11 for delivering the hydrogenated anthraquinone, and a bottom portion of the side surface of the oxidation reaction tower is provided with a gas phase pipeline 12 for delivering the air, wherein the liquid phase pipeline 11 is used to deliver the hydrogenated anthraquinone, and the gas phase pipeline 12 is used to deliver the air for introducing the air into the micro-interface generator so that the gas phase and the liquid phase flow counter currently to increase the probability for contacting. In the oxidation reaction tower 1, a liquid distributor 17, a packing section 16, a seal pan 15 and a hybrid micro-interface unit 13 are arranged from top to bottom, so that after the liquid phase from an upper portion of the oxidation reaction tower is distributed through the liquid distributor, and then after the rectification reaction is performed in the packing section, the liquid phase is subjected to effusion through a bubble cap to improve the reaction effect.

The gas phase coming out at the top portion of the oxidation reaction tower 1 will also go to the gas-liquid separator 18 connected with the oxidation reaction tower 1; after the gas phase at an upper portion of the liquid distributor 17 in the oxidation reaction tower 1 is separated into a gas and a liquid by the gas-liquid separator 18, the gas phase is discharged for treatment, and the liquid phase returns to a lower portion of the seal pan 15; the seal pan is provided with several risers, the liquid overflows from an overflow weir to the bottom, and the gas phase goes to the packing section through the risers.

A side surface of the seal pan 15 is provided with a downcomer, a downcomer of a round shape is in the downcomer 19, and the downcomer is close to an inner wall of the downcomer 19 or connected with the inner wall of the downcomer 19 through a pipe. In addition, the downcomer 19 may also be arranged outside. An upper end of the downcomer 19 is communicated with the seal pan 15, and a lower end thereof is communicated with the hybrid micro-interface unit 13. The embodiment mainly adopts the method of arranging the downcomer 19 inside.

The product generated by the oxidation reaction tower 1 goes to the next section of extraction, and the exhaust gas is recycled. The oxygen contained in the exhaust gas is not much, which shows that the oxygen utilization rate of the oxidation method of the invention is very high.

In order to increase the effect of dispersion and mass transfer, additional micro-interface generators may also be added. The installation position of the generators is actually not limited, and they may be external or built in. When the generators are built-in, they may also be installed on the side wall of a kettle to be oppositely arranged to realize the hedging of the micro-bubbles coming out of the outlet where the micro interface occurs.

In the above embodiment, there is no specific requirement for the number of pump bodies, which may be arranged at corresponding positions as required.

In the embodiment, the mass concentration of the hydrogenated anthraquinone is 120 g/L, the organic solvent is an aromatic hydrocarbon, the heating constant temperature of oxidation is 35° C., and a reaction pressure of the oxidation reaction tower 1 is 0.2 MPa; the air is introduced at a flow rate of 15 L/min, and the reaction time is 10 minutes. After the reaction was completed, samples are taken to analyze the conversion rate and the oxygen utilization rate.

conversion rate of the hydrogenated anthraquinone=amount of reacted raw materials/ amount of original raw materials*100%;

oxygen utilization rate=amount of reacted oxygen/ amount of oxygen contained in the original air*100%;

Analysis results: the conversion rate of the hydrogenated anthraquinone is 97.5%, and the oxygen utilization rate is 97.5%.

Embodiment 2

Other operation steps are consistent with Embodiment 1, only the heating constant temperature of oxidation is 45° C., and the reaction pressure of the oxidation reaction tower 1 is 0.25 MPa, wherein analysis results: the conversion rate of the hydrogenated anthraquinone is 96.5%, and the oxygen utilization rate is 96.5%.

Embodiment 3

Other operation steps are consistent with Embodiment 1, only the heating constant temperature of oxidation is 55° C., and the reaction pressure of the oxidation reaction tower 1 is 0.35 MPa, wherein analysis results: the conversion rate of the hydrogenated anthraquinone is 96.5%, and the oxygen utilization rate is 96.5%.

Comparative Example 1

Other operation steps are consistent with Embodiment 1, only the hybrid micro-interface unit 13 is not added, wherein analysis results: the conversion rate of the hydrogenated anthraquinone is 91%, and the oxygen utilization rate is 91%.

Comparative Example 2

Other operation steps are consistent with Embodiment 1, only the micro-interface generator of hybrid micro-interface unit 13 is replaced by a single micro-interface generator of pneumatic type, wherein analysis results: the conversion rate of the hydrogenated anthraquinone is 96.5%, and the oxygen utilization rate is 96.5%.

In summary, compared with the micro-interface enhanced oxidation system for preparing hydrogen peroxide in the prior art, the micro-interface enhanced oxidation system of the invention has few equipment components, small footprint, low energy consumption, low cost, high safety, controllable reaction, and high conversion rate of raw materials, which is equivalent to providing a more operable micro-interface enhanced oxidation system for the field of preparing hydrogen peroxide, and is worthy of wide application.

Finally, it should be noted that: the above embodiments are only used to illustrate the technical solutions of the present invention, rather than limiting them; although the present invention has been described in detail with reference to the foregoing embodiments, those of ordinary skill in the art should understand that: it is still possible to modify the technical solutions described in the forgoing embodiments, or perform equivalent replacements for some or all of the technical features; and these modifications or replacements do not make the essence of the corresponding technical solution deviate from the technical solutions deviate from the technical solutions of the scope of the various embodiments of the present invention.

What is claimed is:

1. A micro-interface enhanced oxidation system for preparing hydrogen peroxide, characterized in that, comprising:
   an oxidation reactor, wherein a top portion of a side surface of the oxidation reactor is provided with a liquid phase pipeline for delivering hydrogenated anthraquinone, and a bottom portion of the side surface of the oxidation reactor is provided with a gas phase pipeline for delivering air; and a liquid distributor, a packing section, a seal pan and a hybrid micro-interface unit that are arranged in order from top to bottom are arranged in the oxidation reactor, wherein the hybrid micro-interface unit comprises a upper-mounted micro-interface generator and a lower-mounted micro-interface generator that are communicated with each other up and down, and the hydrogenated anthraquinone delivered in goes down in turn until being mixed with the air in the hybrid micro-interfacial unit to be dispersed and crushed after being distributed through the liquid distributor;

a liquid circulation pipeline, wherein a liquid phase coming out from the side surface of the oxidation reactor and from the bottom portion of the oxidation reactor is returned to a top portion of the upper-mounted micro-interface generator through the liquid circulation pipeline;

a gas-liquid separator, wherein after the gas phase located at an upper portion of the liquid distributor in the oxidation reactor is subjected to gas-liquid separation by the gas-liquid separator, the gas phase is discharged for processing, and the liquid phase is returned to a lower portion of the seal pan;

wherein a side surface of the seal pan is provided with a downcomer, a circular downcomer of a round shape is in the downcomer, and the circular downcomer is close to an inner wall of the downcomer or connected with the inner wall of the downcomer through a pipe;

wherein the upper-mounted micro-interface generator and the lower-mounted micro-interface generator are respectively provided with a separate control valve for switching working states when the micro-interface generator is blocked;

wherein a long and narrow gas-liquid emulsion channel is arranged between the upper-mounted micro-interface generator and the lower-mounted micro-interface generator, and the gas-liquid emulsion channel is connected with a gas-liquid emulsion outlet, the gas-liquid emulsion outlet being close to an upper side wall of the lower-mounted micro-interface generator;

wherein an oxidation method using the micro-interface enhanced oxidation system for preparing hydrogen peroxide comprising steps of:

oxidizing the air with the hydrogenated anthraquinone to generate the hydrogen peroxide after being subjected to micro-interface crushing;

wherein a temperature of the oxidation reaction is 35-60° C., and a reaction pressure thereof is 0.2-0.4 MPa.

2. The micro-interface enhanced oxidation system according to claim 1, wherein a temperature of the oxidation reaction is 45-55° C.

3. The micro-interface enhanced oxidation system according to claim 1, wherein a reaction pressure of the oxidation reaction is 0.25-0.35 MPa.

* * * * *